(12) United States Patent
Gehring

(10) Patent No.: US 11,434,866 B2
(45) Date of Patent: Sep. 6, 2022

(54) WATER CURRENT CATCHER SYSTEM FOR HYDROELECTRICITY GENERATION

(71) Applicant: Donald Hollis Gehring, Houston, TX (US)

(72) Inventor: Donald Hollis Gehring, Houston, TX (US)

(*) Notice: Subject to any disclaimer, the term of this patent is extended or adjusted under 35 U.S.C. 154(b) by 0 days.

(21) Appl. No.: 17/206,624

(22) Filed: Mar. 19, 2021

(65) Prior Publication Data
US 2021/0207573 A1 Jul. 8, 2021

Related U.S. Application Data

(63) Continuation-in-part of application No. 16/411,987, filed on May 14, 2019, now Pat. No. 10,975,832, which is a continuation-in-part of application No. 15/997,517, filed on Jun. 4, 2018, now Pat. No. 10,422,311.

(60) Provisional application No. 62/514,625, filed on Jun. 2, 2017.

(51) Int. Cl.
*F03B 17/06* (2006.01)
*F03B 13/26* (2006.01)

(52) U.S. Cl.
CPC .......... *F03B 17/062* (2013.01); *F03B 13/268* (2013.01); *Y02E 10/30* (2013.01)

(58) Field of Classification Search
CPC ....... F03B 13/268; F03B 17/062; Y02E 10/30
See application file for complete search history.

(56) References Cited

U.S. PATENT DOCUMENTS

| | | | | |
|---|---|---|---|---|
| 1,388,686 A | * | 8/1921 | Zaugg | F03B 7/00 405/75 |
| 1,476,457 A | * | 12/1923 | Miller | F03B 7/00 415/60 |
| 1,662,937 A | * | 3/1928 | Ramsdell | F03B 7/00 416/197 R |
| 1,810,113 A | * | 6/1931 | Schlotzhauer | F03D 3/0472 415/2.1 |
| 2,276,714 A | * | 3/1942 | Brown | F01D 1/026 415/214.1 |
| 4,076,447 A | * | 2/1978 | Granath | F03B 13/145 416/103 |

(Continued)

*Primary Examiner* — Pedro J Cuevas

(57) ABSTRACT

An enclosed hydroelectricity generator system includes an inlet channel, a low-pressure enclosed turbine, an outlet channel, and a hydroelectric generator. The enclosed turbine includes an inner can, an outer housing, a turbine axle, a plurality of paddle boards, and a water pressure containment chamber. The turbine axle is concentrically and symmetrically connected to the inner can. The plurality of paddle boards is radially connected around the inner can. The inner can and the plurality of paddle boards are rotatably enclosed within the outer housing. The inlet channel and the outlet channel are oppositely traversing into the outer housing. The inlet channel is in fluid communication with the outer channel through the water pressure containment chamber. The hydroelectric generator is operatively coupled with the turbine axle so that a kinetic energy of a pressurized water flow that enters into the water pressure containment chamber can be converted into hydroelectricity.

9 Claims, 13 Drawing Sheets

(56) References Cited

U.S. PATENT DOCUMENTS

| | | | | |
|---|---|---|---|---|
| 4,296,602 A * | 10/1981 | Hales | ............... | F03B 17/063 415/92 |
| 4,350,900 A * | 9/1982 | Baughman | ............... | F03D 15/20 416/DIG. 4 |
| 4,436,480 A * | 3/1984 | Vary | ............... | F03B 7/00 415/906 |
| 4,463,555 A * | 8/1984 | Wilcoxson | ............... | F01D 1/026 415/10 |
| 4,488,055 A * | 12/1984 | Toyama | ............... | F03B 13/08 416/185 |
| 4,516,033 A | 5/1985 | Olson | | |
| 4,731,545 A * | 3/1988 | Lerner | ............... | H02K 7/1823 416/185 |
| 5,136,174 A | 8/1992 | Simoni | | |
| 5,137,423 A * | 8/1992 | Eda | ............... | F03B 17/065 415/8 |
| 5,140,254 A * | 8/1992 | Katzman | ............... | H02K 7/1823 322/35 |
| 5,249,923 A * | 10/1993 | Negus | ............... | F03B 13/00 415/203 |
| 5,451,137 A * | 9/1995 | Gorlov | ............... | F03D 13/20 415/75 |
| 5,755,553 A * | 5/1998 | Laemthongsawad | ............... | F03B 17/005 415/92 |
| 6,309,179 B1 * | 10/2001 | Holden | ............... | F03B 1/04 415/101 |
| 6,655,907 B2 * | 12/2003 | Brock | ............... | F03D 9/25 415/4.2 |
| 7,466,035 B1 * | 12/2008 | Srybnik | ............... | F03B 17/063 290/43 |
| 7,503,744 B1 * | 3/2009 | Broome | ............... | F03B 7/003 415/4.1 |
| 7,564,144 B1 * | 7/2009 | Srybnik | ............... | F03B 13/10 290/43 |
| 7,605,490 B2 * | 10/2009 | Srybnik | ............... | F03B 1/04 290/52 |
| 7,619,320 B2 * | 11/2009 | Omer | ............... | F03B 7/003 290/55 |
| 7,785,065 B2 | 8/2010 | Clemens | | |
| 7,945,973 B2 * | 5/2011 | Khorshid | ............... | E03C 1/055 4/623 |
| 7,969,034 B2 | 6/2011 | Winius | | |
| 8,210,805 B1 * | 7/2012 | Osborne | ............... | F03B 1/00 415/203 |
| 8,573,890 B2 | 11/2013 | Gehring | | |
| 8,596,956 B2 * | 12/2013 | Chir | ............... | F03B 13/105 415/908 |
| 8,770,915 B2 * | 7/2014 | Lim | ............... | H02K 7/1823 415/3.1 |
| 8,823,196 B1 | 9/2014 | Gehring | | |
| 8,890,353 B2 | 11/2014 | Cunnane | | |
| 8,943,821 B2 | 2/2015 | Hagemann et al. | | |
| 8,956,103 B2 | 2/2015 | Gehring | | |
| 9,534,579 B2 | 1/2017 | Van Rompay | | |
| 9,546,644 B2 * | 1/2017 | Oroza | ............... | C25B 1/04 |
| 9,803,614 B2 * | 10/2017 | Williams | ............... | F03B 13/08 |
| 10,041,468 B2 * | 8/2018 | Lai | ............... | F03B 13/10 |
| 10,202,960 B2 * | 2/2019 | Williams | ............... | H02K 7/1807 |
| 10,233,901 B2 * | 3/2019 | Tay | ............... | F03D 3/04 |
| 10,422,311 B2 | 9/2019 | Gehring | | |
| 10,458,394 B2 * | 10/2019 | De Luca | ............... | F03G 6/02 |
| 10,934,992 B2 * | 3/2021 | Kuroishi | ............... | H02K 5/24 |
| 2002/0066608 A1 * | 6/2002 | Guenard | ............... | F03D 15/10 180/65.285 |
| 2008/0219831 A1 * | 9/2008 | Yen | ............... | F03B 13/00 415/1 |
| 2009/0160193 A1 * | 6/2009 | Farb | ............... | F03B 13/00 415/60 |
| 2011/0037261 A1 * | 2/2011 | Champ | ............... | B60L 8/006 290/55 |
| 2012/0068464 A1 * | 3/2012 | Farb | ............... | F03D 3/061 416/243 |
| 2012/0321466 A1 * | 12/2012 | Chir | ............... | F03B 3/14 416/128 |
| 2013/0071240 A1 * | 3/2013 | Chir | ............... | F03B 13/264 415/220 |
| 2019/0032625 A1 * | 1/2019 | Kling | ............... | F03B 11/02 |
| 2019/0257281 A1 * | 8/2019 | Raina | ............... | F03B 13/264 |
| 2019/0277243 A1 * | 9/2019 | Tseng | ............... | F03B 17/062 |
| 2020/0232438 A1 * | 7/2020 | Grandperret | ............... | F03B 17/063 |

* cited by examiner

US 11,434,866 B2

WATER CURRENT CATCHER SYSTEM FOR HYDROELECTRICITY GENERATION

The current application is a continuation-in-part (CIP) application of the U.S. non-provisional application Ser. No. 16/411,987 filed on May 14, 2019. The U.S. non-provisional application Ser. No. 16/411,987 claims a priority to U.S. non-provisional application Ser. No. 15/997,517 filed on Jun. 4, 2018. The U.S. non-provisional application Ser. No. 15/997,517 claims a priority to a U.S. provisional application Ser. No. 62/514,625 filed on Jun. 2, 2017.

FIELD OF THE INVENTION

The present invention relates generally to hydro-power generation. More specifically, the present invention utilizes at least one pressurized water conduits to supply an upstream water flow into a highly efficient low revolution per minute generator to convert the kinetic energy of the upstream water flow into electrical energy.

BACKGROUND OF THE INVENTION

Waterwheels:

For hundreds of years and before the advent of modern dams and associated very large water reservoirs, the power of flowing water was harnessed by a waterwheel. Most waterwheels were a relatively simple, relatively low cost, normally only used a portion of the river's flow and were usually located near one bank of the river and turned a machine located on the bank of the river or stream with some sort of mechanical drive system. These waterwheels did not require the purchase in thousands of acres of land, did not require a significant amount of land to be cleared and flooded, and did not require deep-water reservoirs. These waterwheels were commonly located in a high flow rate location along a riverbank near natural river elevation changes. Developers often increased the river's flow rate near the waterwheel by building weirs across the river that raised the elevation of the river to divert the water to the waterwheel, to increase the amount of water to the waterwheel, and to increase the velocity of the river's flow across the waterwheel's paddles with minimum expense and without buying and flooding significant acreages of land. The investment in the weir was usually small compared to our current day costs to build a large modern dams and associated reservoirs. These weirs would usually raise the water level slightly creating a small lake upstream of the weir. These lakes generally provide as a recreational area for boating, fishing, and other water related activities. Today's available construction equipment and construction techniques have lowered weir construction costs significantly.

The old waterwheels:
- were sometimes large in diameter compared to their width.
- were usually narrow compared to their diameter.
- often had closely spaced paddles with small areas.
- often had paddles that were in the shadow of the previous paddle.
- often had paddles that served more as water holders for gravity to turn the waterwheel rather than flowing water pressure turning the waterwheel.
- often harnessed only a small portion the river or stream's flow for power.
- were often located in relatively small streams avoiding flood water damage.
- produced relatively small torque, but adequate for grinding grain, crushing grapes, pumping water, turning belts, sawing logs, etc.
- were low RPM devices.
- were not able to move up and down with varying water levels to avoid flood water damage.
- were usually unable to take full advantage of the higher river flow rates since they had a fixed elevation.
- were usually unable to avoid high flood water damage.
- often faced significant mechanical losses when using gears to transfer torque.
- lowest paddles were often submerged in the stationary water below the weir resulting in significant drag and resistance to turning the paddle wheel.
- were not able to transfer their produced power much beyond the banks of the rivers limiting use of the power to near the water's edge.
- were gradually replaced by the stream engines which could provide power anywhere, even for moving objects such as trains, tractors, ships, etc. The steam engines were later replaced by even more compact and lighter internal combustion engines and electric motors.

For the purpose of size comparison, the two 26-foot (7.9-m) diameter side waterwheels on the SS California, Pacific Mail's first ship running from Panama City to San Francisco, were powered by a large one-cylinder side-lever engine built by Novelty Iron Works of New York City. The engine's cylinder bore was about 75 inches (190 cm) in diameter with a stroke of 8 feet (2.4 m). The engine turned the two side waterwheels at about 13 revolutions per minute, driving the ship at about eight knots, with 14 knots possible under good conditions. She carried about 520 tons of coal.

Dams, reservoirs, water storage, and hydro-electric power generation projects:

A large percentage of today's power is supplied through hydro-electric power which is mainly obtained from large government supported multi-purpose water storage and power generation facilities. However, the percentage of today's power supplied by hydro-electric power is declining and more power is being supplied by other forms of power generations such as wind and solar power. Many old reservoirs today have very low water levels because rainwater is low, and the water is needed for other purposes than power generation. As water levels decline, the head pressures on the turbines also declines along with the power outputs.

Large dams have been built to create large reservoirs, and relatively small pipes passing through the dams to deliver high pressure and high velocity water to turn relatively small high drag coefficient high tolerance confined turbines that turn relatively small and relatively low cost but very powerful high RPM generators. The high RPM turbines are usually connected directly to the high RPM generators. Power generation can remain fairly constant when the reservoir level remains fairly constant. For the reservoir to remain at a fairly constant level, the water removal must roughly equal the water entering the reservoir. Since river, stream and tidal flow rates and water levels vary over time, it is difficult to maintain constant power production. Large reservoirs often reduce power generation to maintain water levels.

Hydro-electric projects are often made possible when the reservoirs are located in remote areas where much of the needed reservoir land may still be owned by the government and when the government exercises its right of immanent domain to buy the large acreages of land from private landowners needed for the reservoirs. New hydroelectric reservoir/power plant projects are fewer today in many parts of the developed world due to high cost of the projects compared to other new power plant alternatives, the increased regulations, increased environmental impact concerns, increased land costs, and increased competition from other viable low LCOE power plants, like wind, solar, gas, etc. The biggest hurdle of the new hydroelectric reservoir/power plant projects can largely be attributed directly or indirectly to the significant amount of land that needs to be purchased and flooded to raise the water levels of the rivers to create the high water pressure jets needed for high RPM turbines and generators.

Today, some hydroelectric reservoir/power plants are taking on the new role of surplus power storage and the surplus power is largely coming from the growing number of renewable energy power plants like wind, solar, etc. The surplus power is being used to pump water from lower level reservoirs to higher level reservoirs equipped with hydroelectric power generation facilities. When the wind speeds are low and when the sun is not shining, the stored water in the hydro-electric power plant reservoirs is used to generate electricity. Other forms of power storage are also being used but hydroelectric storage is the most common and the lowest cost.

It is an objective of the present invention to provide a system which uses normal stream flow, river flow, tidal flow, and pump water storage flow to provide sustained power eliminating the need to purchase and flood large areas of land, which is one of the biggest hurdles facing new hydroelectric power plant/reservoir projects. More specifically, streams/rivers undergo many elevations changes along their route to the sea and only a few of the elevation change locations along these waterways have been used for power generation. Many more changes in water level locations can still be used and, in the process, deliver significant additional power to the grid. The present invention allows small low costs weir type reservoirs to be used or built at numerous locations along these waterways. These small reservoirs can generate significant power at very low cost and with minimum negative impact thanks to the elimination of the need to flood large areas of land to create large reservoirs. The present invention also uses numerous small reservoirs to generate similar amounts of power to large reservoirs and in the process increase: the fish population, wildlife, drinking water supplies, water tables, etc. The present invention uses large diameter waterwheels with high drag coefficient paddles to drive low RPM electric generators that can supply power to remote users thousands of miles away. The paddles of the waterwheel are operated in confined close tolerance channels with minimum flowing water energy losses. The torque produced by the flowing water pressure on these paddles is high enough to turn the new low torque high power output wind turbine type generators at their capacity. The generators can either be turned directly or through the use of a gear box. The waterwheels and their generators are sized for the individual water resource opportunities. The present invention can also be used for both uni-directional upstream to downstream river flow applications and for bi-directional tidal applications.

DETAIL DESCRIPTIONS OF THE INVENTION

All illustrations of the drawings are for the purpose of describing selected versions of the present invention and are not intended to limit the scope of the present invention.

The present invention is a hydroelectricity generating unit that captures water current energy from river currents, tidal estuary currents or from streams. More specifically, the present invention converts water current into the hydroelectricity, as the generated electricity from the present invention can be exported into an electrical substation or an electrical distribution center through at least one electrical cable. The present invention is integrated onto a surface environment so that the present invention is able to efficiently capture the water current, wherein the surface environment can be a riverbed wherein a flowing body of water is obstructed through a weir 35 or a tidal barrage. The present invention is built across the flowing body of water whose water is pressurized and forced to flow through water duct delivery channels in a weir 35 or a tidal barrage so that a pressurized water flow can be utilized to operatively rotate an enclosed hydroelectricity generator system to generate electricity. A control and monitoring facility can be located adjacent to or remotely from the present invention. The present invention also utilizes the installation of scour protection around the high flow velocity areas like the weir 35, the water duct delivery channels, overflow spillway areas, etc. to prevent erosion and undermining.

Figure 3:
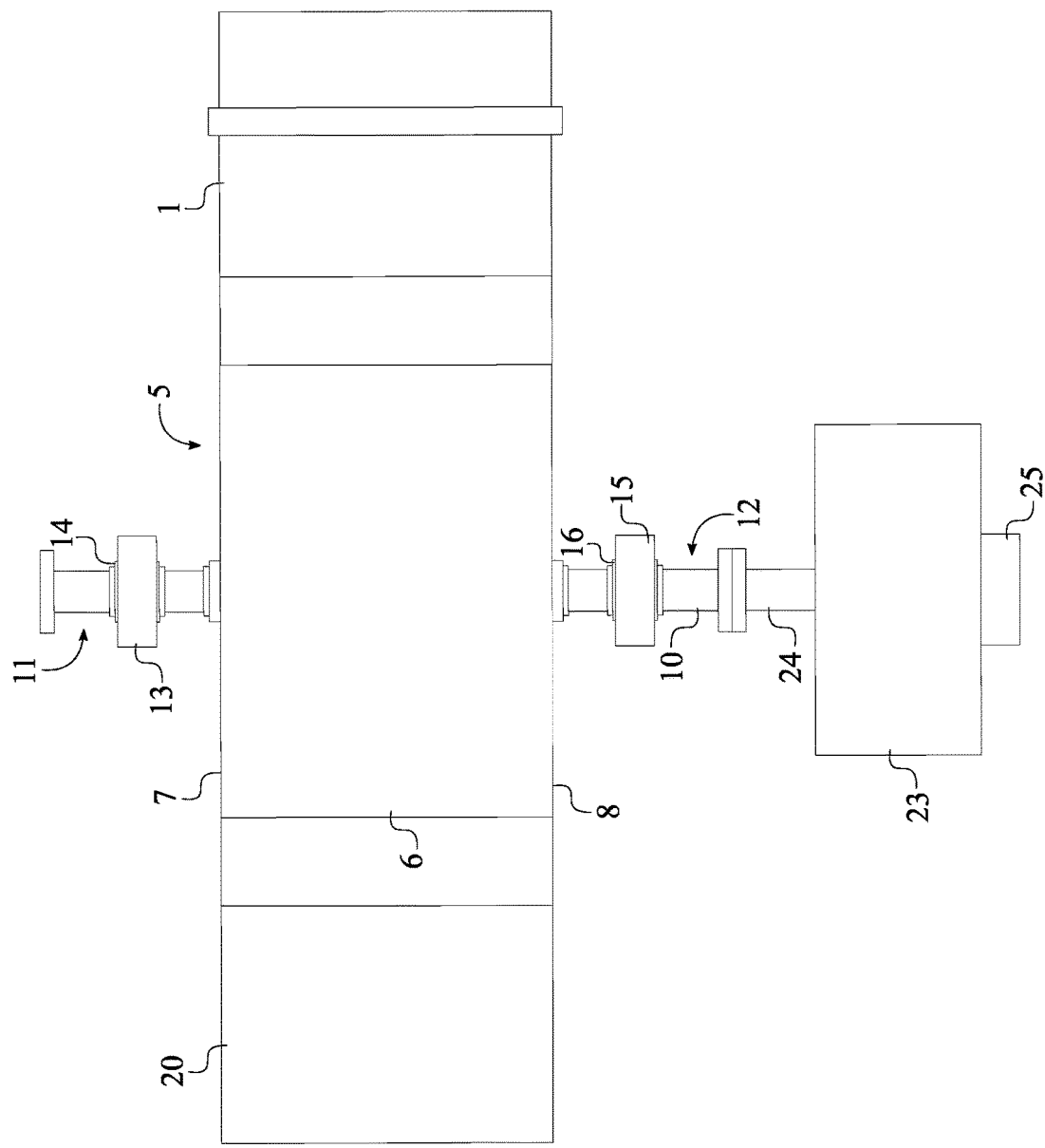
FIG. 3 is a top view of the present invention.
Figure 4:
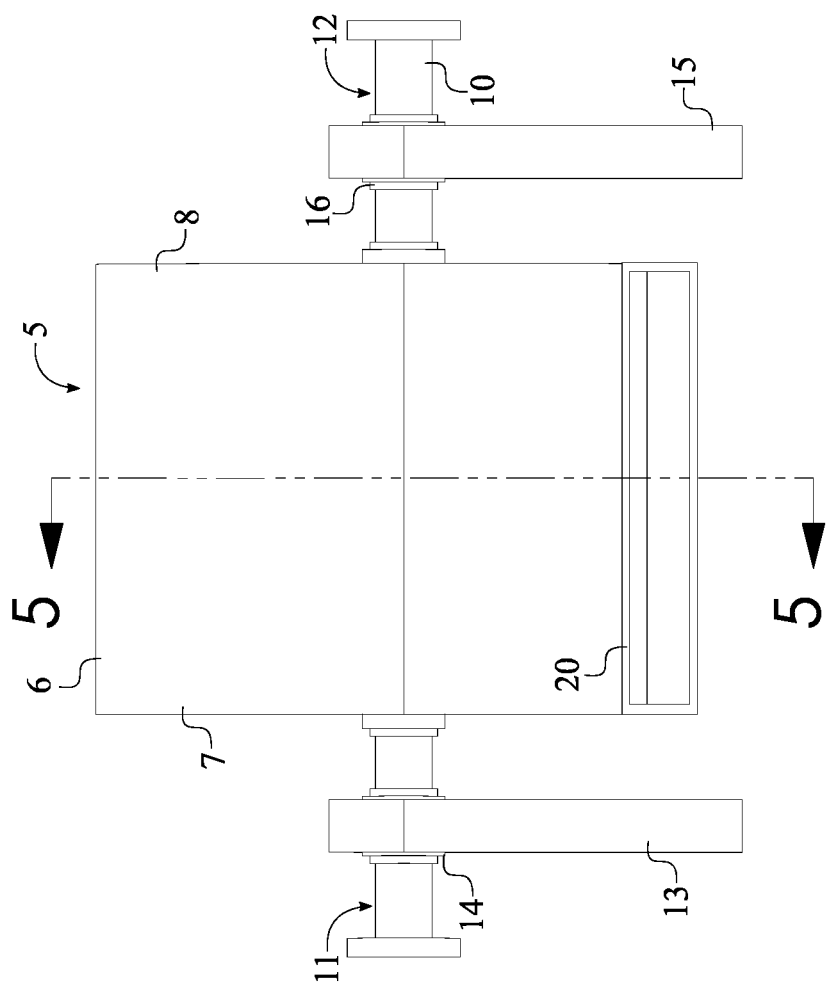
FIG. 4 is a front view of the enclosed turbine of the present invention, showing the plane upon which a cross sectional view is taken shown in FIG. 5.
Figure 5:
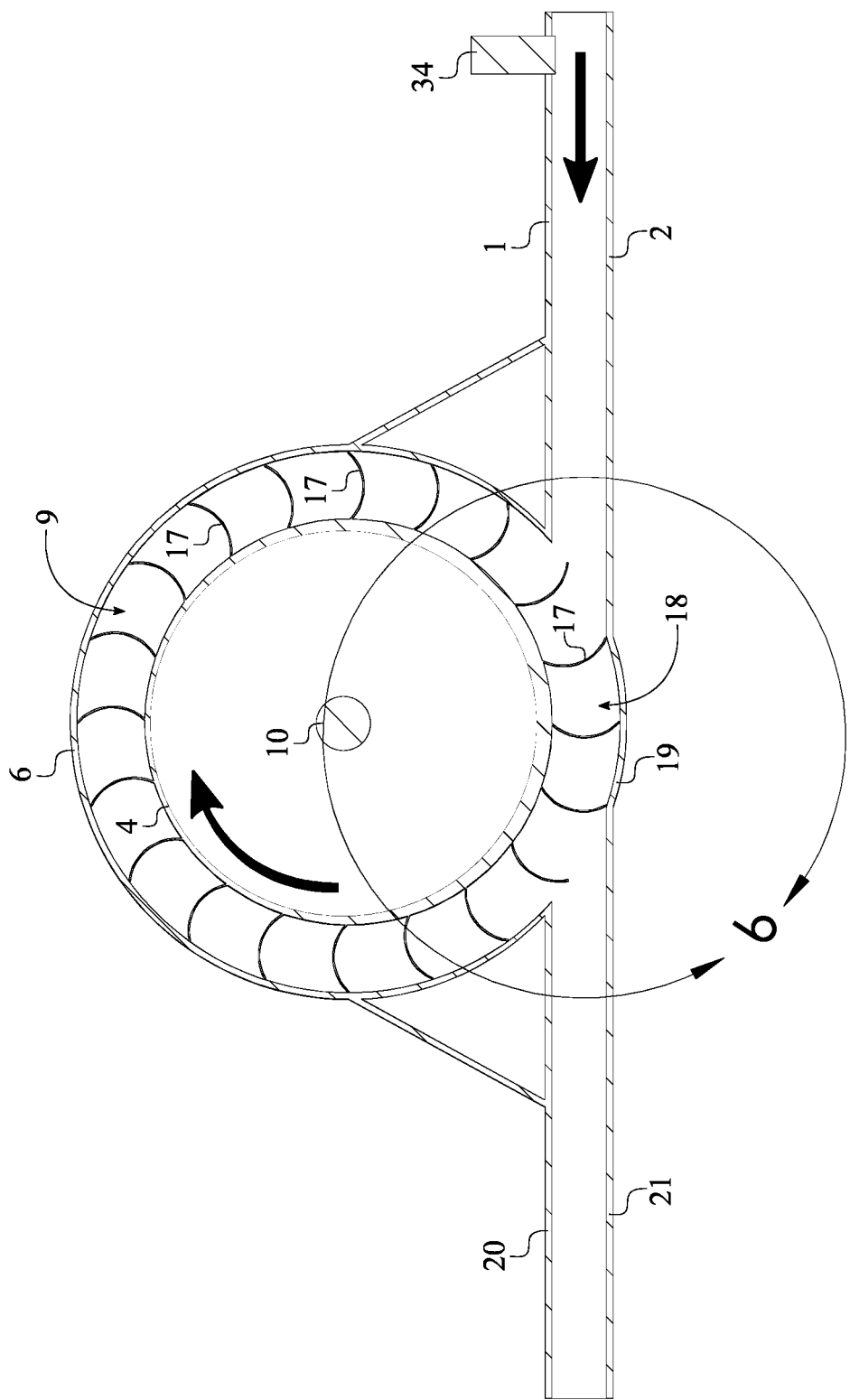
FIG. 5 is a cross section view of the enclosed turbine of the present invention taken along line 5-5 of FIG. 4, showing the section which detailed is taken in FIG. 6.

The present invention comprises an inlet channel 1, at least one low-pressure enclosed turbine 3, an outlet channel 20, and at least one hydroelectric generator 22 as shown in FIG. 1-5. The low-pressure enclosed turbine 3 comprises an inner can 4, an outer housing 5, a turbine axle 10, a plurality of paddle boards 17, and a water pressure containment chamber 18 as shown in FIG. 5. In reference to the general configuration of the present invention, the turbine axle 10 is concentrically connected to the inner can 4 and symmetrically positioned with the inner can 4. The plurality of paddle boards 17 is radially connected around the inner can 4 in such a way that the inner can 4 and the plurality of paddle boards 17 are rotatably enclosed within the outer housing 5.

In order to maintain the rotational balance of the inner can 4, the turbine axle 10 symmetrically traverses through the outer housing 5. The inlet channel 1 traverses into the outer housing 5 so that a pressurized water flow can be directed towards the low-pressure enclosed turbine 3 to rotate the inner can 4. The outlet channel 20 traverses into the outer housing 5 so that the pressurized water flow that enters into the low-pressure enclosed turbine 3 can be discharged after the rotation of the inner can 4. In order to optimize the efficiency of the entering and discharging for the flow of water, the inlet channel 1 and the outlet channel 20 are oppositely positioned of each about the water pressure containment chamber 18. Furthermore, the inlet channel 1 is in fluid communication with the outlet channel 20 through the water pressure containment chamber 18 that causes at least one paddle board from the plurality of paddle boards 17 continuously has full pressure on one side of the board and zero pressure on the other side of the board while the board is in the downward radiused channel bottom area. This continuous imbalance of pressure imposes a large continuous force on each of the plurality of paddle boards 17 as it passes through the water pressure containment chamber 18 thus resulting in continuous high torque on the low-pressure enclosed turbine 3. The hydroelectric generator 22 is operatively coupled with the turbine axle 10, wherein a kinetic energy of the pressurized water flow that enters into the water pressure containment chamber 18 is converted into hydroelectricity via the hydroelectric generator 22.

Figure 11:
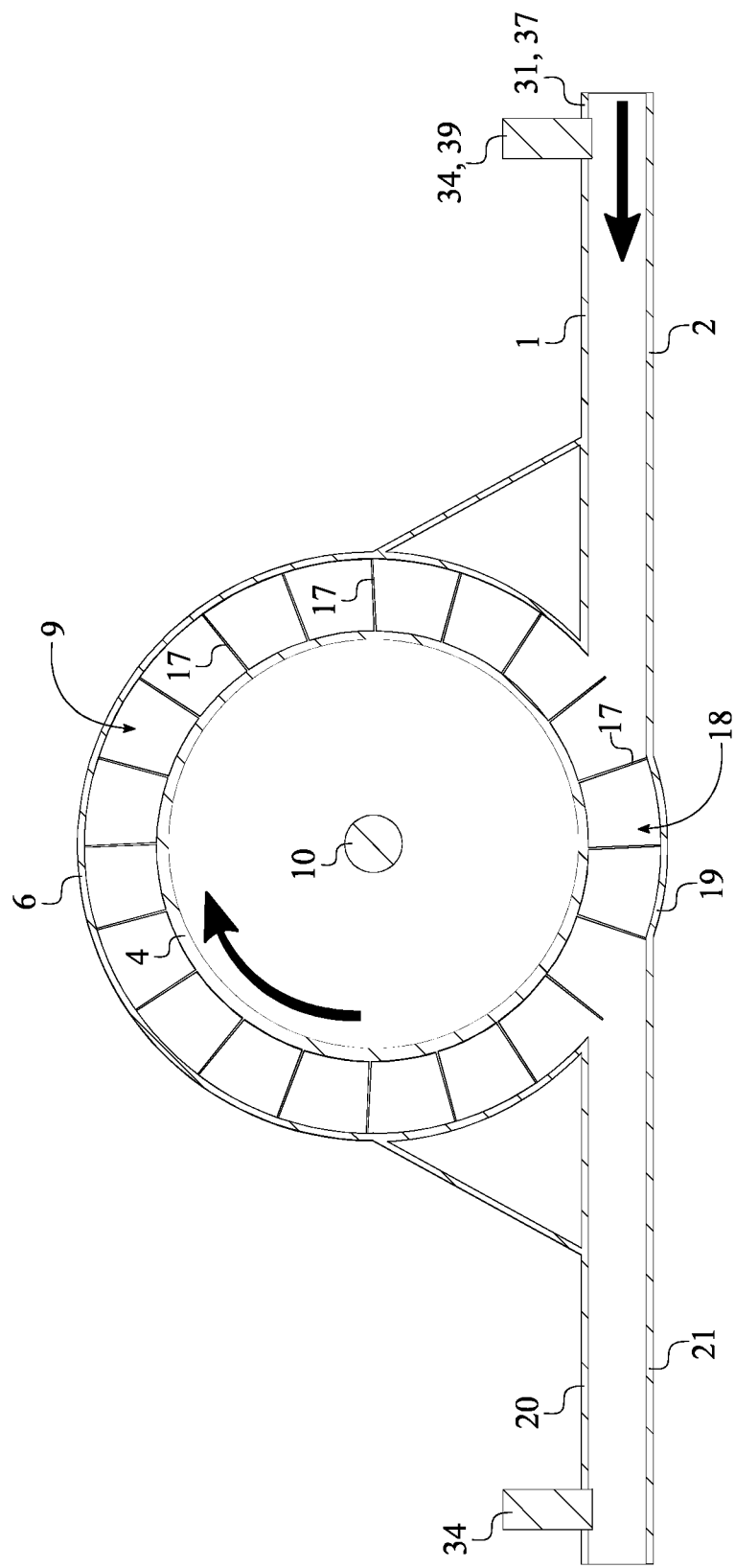
FIG. 11 is a cross section view of the enclosed turbine of the present invention utilized with the bi-directional tidal flow system, wherein the pressurized water flow enters into the present invention through the first conduit.
Figure 12:
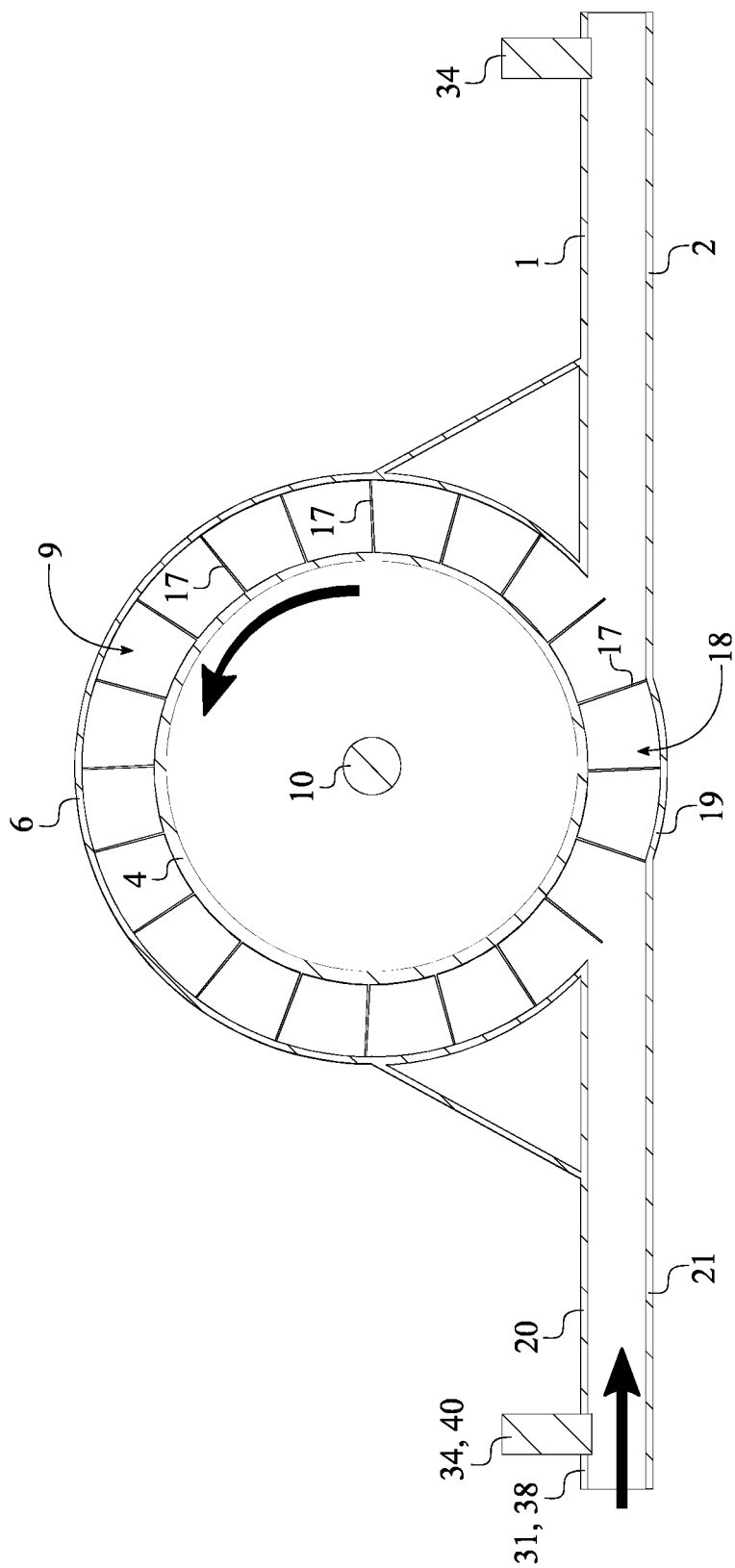
FIG. 12 is a cross section view of the enclosed turbine of the present invention utilized with the bi-directional tidal flow system, wherein the pressurized water flow enters into the present invention through the second conduit.
Figure 13:
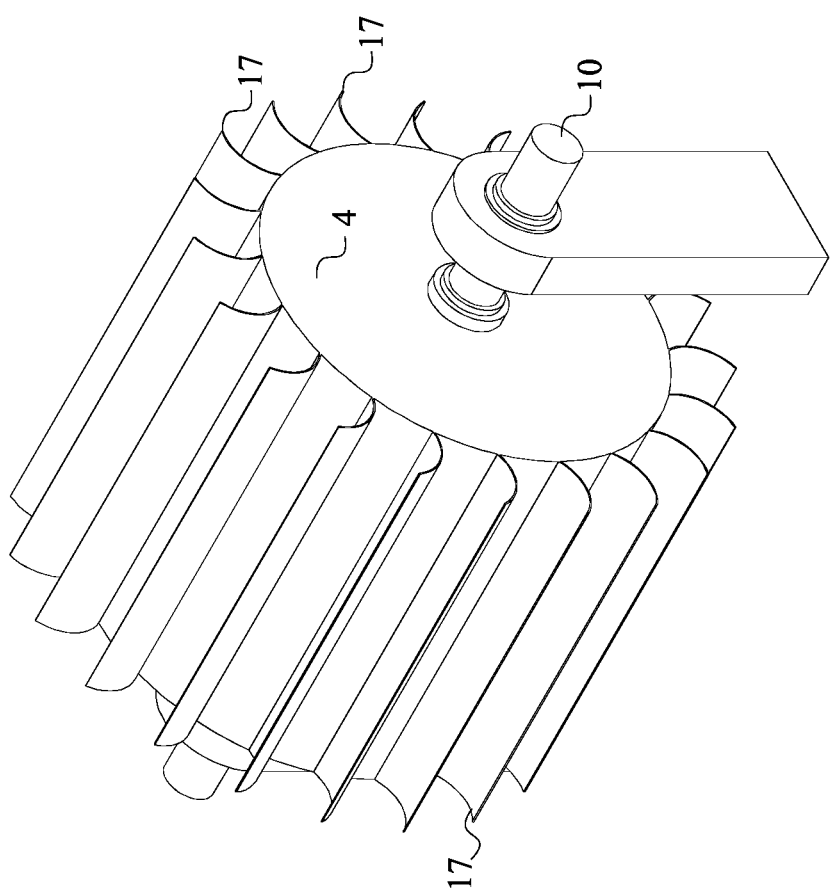
FIG. 13 is a perspective view of the enclosed turbine of the present invention, without showing the outer housing, to illustrate the length of the inner can and the plurality of paddle boards.

The inner can 4 is a cylindrical body which functions as the structural body on which to mount the plurality of paddle boards 17 and the turbine axle 10. In reference to FIG. 5-4, the inner can 4 is concentrically mounted around the turbine axle 10 so that the turbine axle 10 and the plurality of paddle boards 17 are equally spaced and able to share the same the rotational axis of the inner can 4 during the operation of the present invention. In order to optimize the efficiency of the low-pressure enclosed turbine 3, a length of the inner can 4 is equal to a length of each of the plurality of paddle boards 17 as shown in FIG. 13. In other words, each of the plurality of paddle boards 17 is linearly extended across the inner can 4 from one end of the can to the other end. Preferably, each of the plurality of paddle boards 17 is formed into a high drag coefficient perimeter blades to maintain maximum water pressure from the pressurized water flow. Depending upon the type of surface environment that the present invention is utilized, each of the plurality of paddle boards 17 can be delineated into a curved surface body or flat surface body. For example, when the present invention is utilized with a uni-directional river flow system 30, each of the plurality of paddle boards 17 is formed into a curved surface body, as shown in FIG. 5, so that the kinetic energy of the pressurized water flow can be maximized. When the present invention is utilized with a bi-directional tidal flow system 36, each of the plurality of paddle boards 17 is formed into a flat surface body, as shown in FIG. 11-12, so that the pressurized water flow that flows into the low-pressure enclosed turbine 3 from opposite directions can selectively rotate the inner can 4 in the clockwise or counterclockwise direction.

Figure 6:
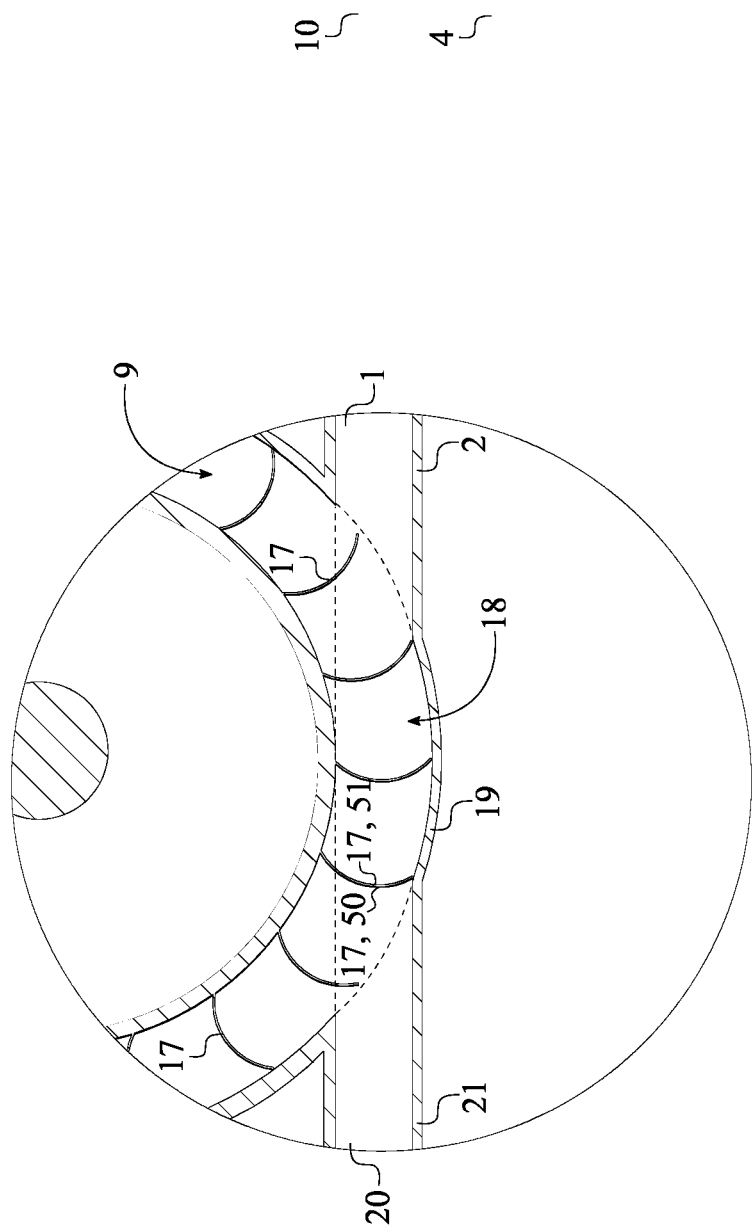
FIG. 6 is a detailed view for of the enclosed turbine of the present invention taken within section line 6 in FIG. 5.

Each of the plurality of paddle boards 17 comprises a high pressure surface 51 and a low pressure surface 50 as shown in FIG. 6. More specifically, the high pressure surface 51 is oriented towards the inlet channel 1 to harvest the energy of the pressurized water flow. The low pressure surface 50 is oriented towards the outlet channel 20 to maximize the rotation of the inner can 4.

Figure 1:
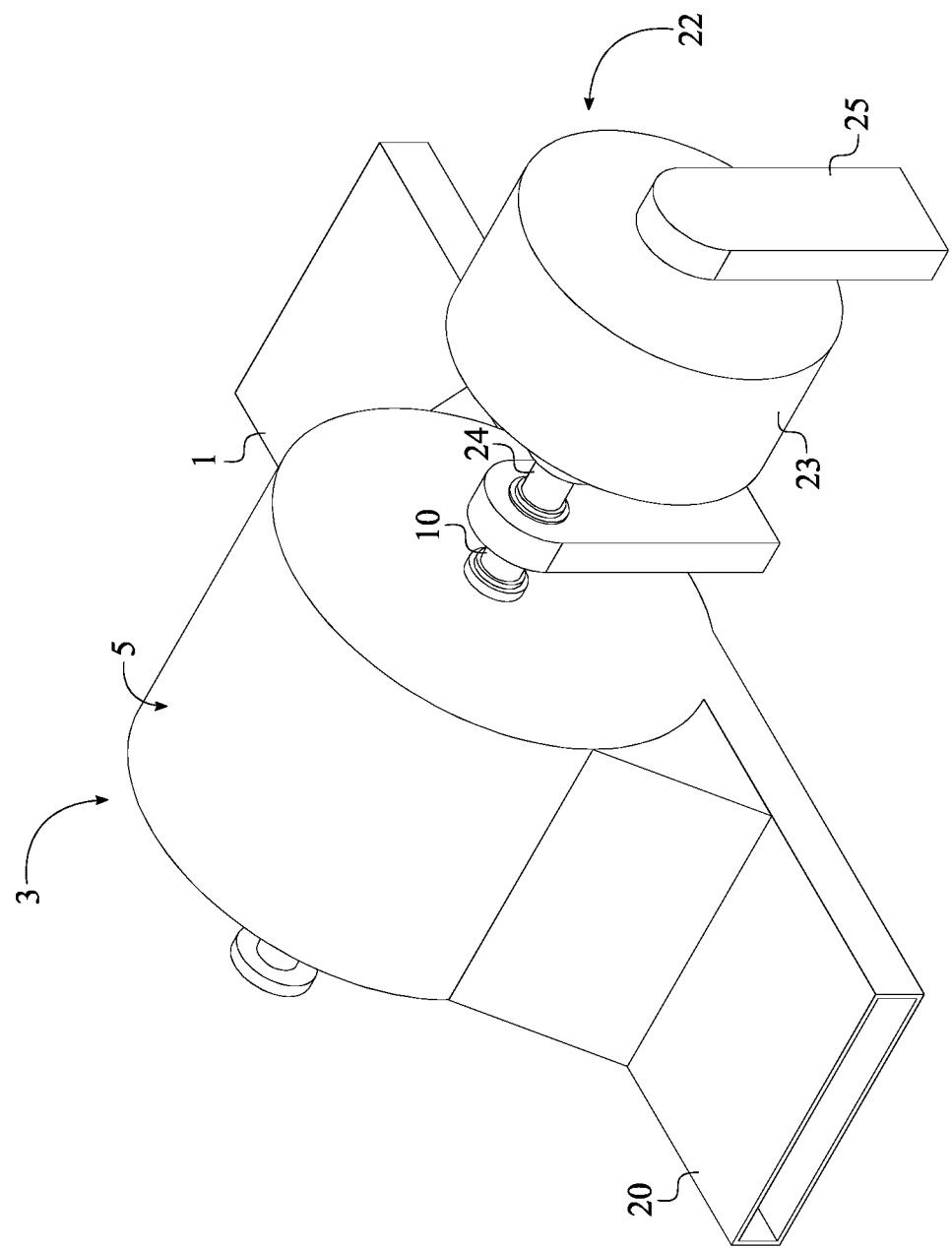
FIG. 1 is a perspective view of the present invention.
Figure 2:
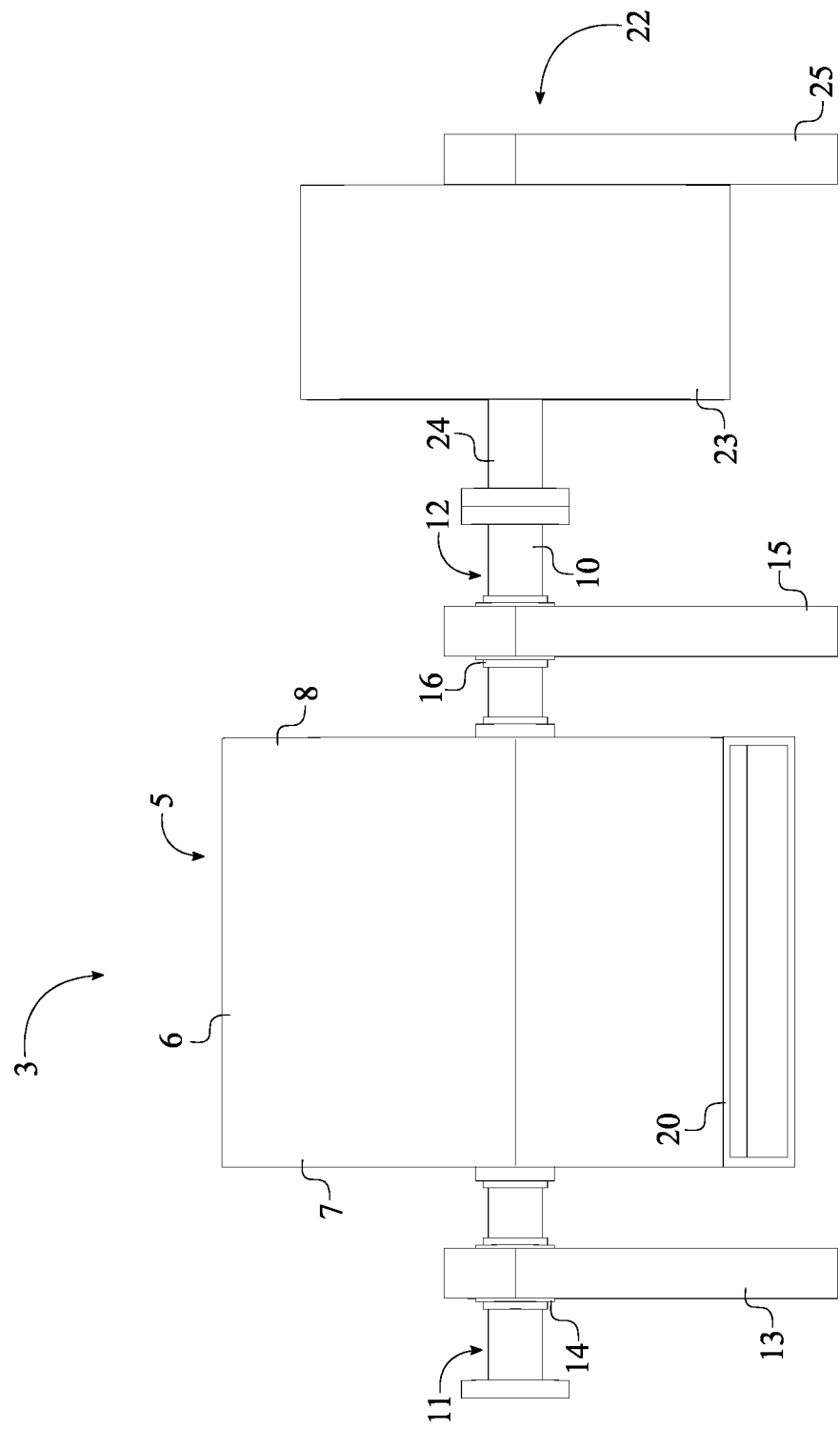
FIG. 2 is a front view of the present invention.

In reference to FIG. 2-4, the outer housing 5 comprises a radial plate 6, a first annular plate 7, a second annular plate 8, and a radial water channel 9. The first annular plate 7 and the second annular plate 8 are oppositely positioned of each other about the radial plate 6 thus forming an enclosure for the inner can 4 and the plurality of paddle boards 17. More specifically, the first annular plate 7 is perimetrically connected to the radial plate 6 so that a first end 11 of the turbine axle 10 can concentrically traverse through the first annular plate 7. A first support bearing is utilized in between the turbine axle 10 and the first annular plate 7 to minimize rotational friction of the turbine axle 10 and to delineate a hermetic connection. The second annular plate 8 is perimetrically connected to the radial plate 6 so that a second end 12 of the turbine axle 10 can concentrically traverse through the second annular plate 8. A second support bearing is utilized in between the turbine axle 10 and the second annular plate 8 to minimize rotational friction of the turbine axle 10 and to delineate a hermetic connection. More specifically, the first support bearing and the second support bearing each comprises an outer sleeve and inner sleeve that are rotatably connected to each other. The outer sleeve provides a fixed position and mounts to the corresponding annular plate while the inner sleeve is axially connected to the corresponding end of the turbine axle 10 and enables the turbine axle 10 to simultaneously rotate about the rotational axis of the inner can 4. As a result, the first annular plate 7, the second annular plate 8, the radial plate 6, the first support bearing, and the second support bearing are able to fully enclose the inner can 4 and the plurality of paddle boards 17. In other words, the radial water channel 9 is delineated between the inner can 4, the radial plate 6, the first annular plate 7, the second annular plate 8, the first support bearing, and the second support thus allowing the plurality of paddle boards 17 to be rotatably interspaced within the radial water channel 9.

In reference to FIG. 6, the water pressure containment chamber 18 comprises a concave floor section 19 so that the plurality of paddle boards 17 can freely rotate about the rotational axis of the inner can 4. More specifically, the concave floor section 19 is terminally connected to a bottom surface 2 of the inlet channel 1 and a bottom surface 21 of the outlet channel 20 thus resulting a linear passageway for the pressurized water flow to travel through as an upper perimeter of the water pressure containment chamber 18 is delineated by the inner can 4. Furthermore, at least one paddle board from the plurality of paddle boards 17 is fully engaged within the water pressure containment chamber 18 so that the maximum pressure of the pressurized water flow is able to impose on at least one paddle board at all times. In other words, the pressurized water flow enters into the inlet channel 1 at 100% pressure force and then enters into the water pressure containment chamber 18 at 100% pressure force. As a result, the at least one paddle board is always able to receive 100% pressure force within the inlet channel 1 and the water pressure containment chamber 18. Once the pressurized water flow exits into the outlet channel 20 via the water pressure containment chamber 18 the pressure force of the pressurized water flow becomes zero, wherein the 100% pressure force of the pressurized water flow is converted into rotational energy of the inner can 4 through the plurality of paddle boards 17. The aforementioned continuous imbalance of pressure imposes a large continuous force on each of the plurality of paddle boards 17 that passes through the water pressure containment chamber 18 thus applying a continuous high torque on the low-pressure enclosed turbine 3. While the at least one paddle board is fully engaged within the water pressure containment chamber 18, a remaining paddle boards from the plurality of paddle boards 17 continuously and freely able to rotate within the radial water channel 9 without any drag force. In other words, the pressurized water flow only engages with the plurality of paddle boards 17 within the water pressure containment chamber 18 in order to maximize the efficiency of the present invention.

In reference to FIG. 4, the present invention further comprises a first base 13, a second base 15, a first axle bearing 14, and a second axle bearing 16. The first base 13 is positioned adjacent to the first end 11 of the turbine axle 10 thus allowing the turbine axle 10 to be rotatably mounted to the first base 13 through the first axle bearing 14. The second base 15 is positioned adjacent to the second end 12 of the turbine axle 10 thus allowing the turbine axle 10 to be rotatably mounted to the second base 15 through the second axle bearing 16. In other words, the first base 13 and the second base 15 function as the structural supports for the turbine axle 10 so that the first axle bearing 14 and the second axle bearing 16 are able to minimize the rotational friction of the turbine axle 10, resist the maximum forces, and resist vibrations imposed on the structural supports by the low-pressure enclosed turbine 3 and the hydroelectric generator 22. More specifically, the first axle bearing 14 and the second axle bearing 16 each comprises an outer sleeve and inner sleeve that are rotatably connected to each other. The outer sleeve provides a fixed position and mounts to the corresponding base while the inner sleeve is axially connected to the corresponding end of the turbine axle 10 and enables the turbine axle 10 to simultaneously rotate about the rotational axis of the inner can 4.

In reference to FIG. 2-3, the hydroelectric generator 22 be a single generator unit or multiple generator units. The hydroelectric generator 22 comprises a stator 23, a rotor 24, and a supporting base 25. More specifically, the stator 23 mounted to the supporting base 25 so that the hydroelectric generator 22 can be secured to the surface environment. A rotor 24 is operatively coupled with the turbine axle 10 so that the kinetic energy of the pressurized water flow that enters into the water pressure containment chamber 18 through the inlet channel 1 can be utilized to rotate the rotor 24. Preferably, the turbine axle 10 is axially connected to the rotor 24 to maximize the efficiency of the present invention. However, the turbine axle 10 can be indirectly and operatively coupled to the rotor 24 through a torque transfer mechanism such as a gearbox system, a hydraulic system, or a belt system. Furthermore, the torque transfer mechanism enables the present invention selectively chose from inline operation of the hydroelectric generator 22 or offline placement of the hydroelectric generator 22.

Figure 7:
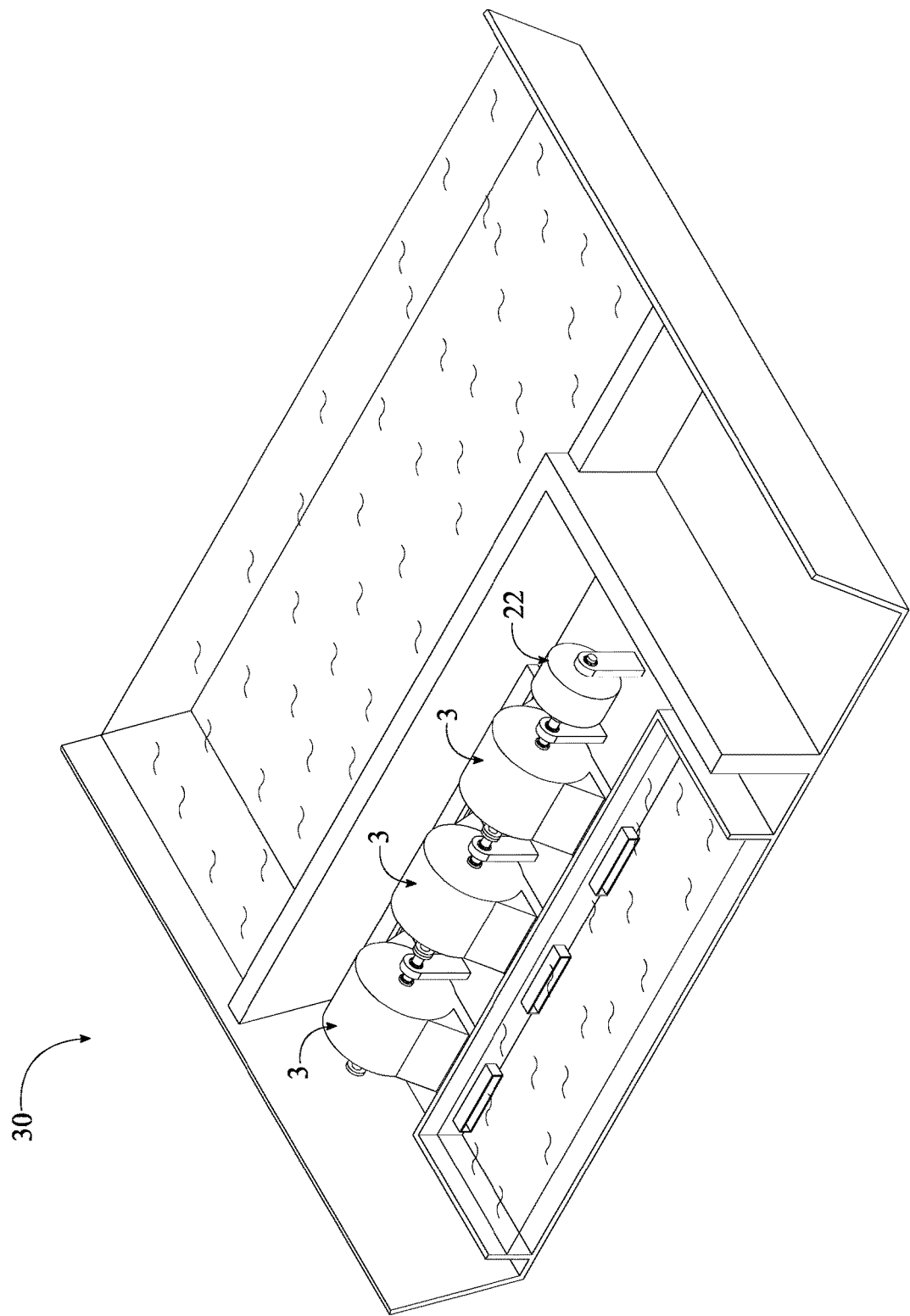
FIG. 7 is a perspective view of the present invention shown with the uni-directional flow system.
Figure 8:
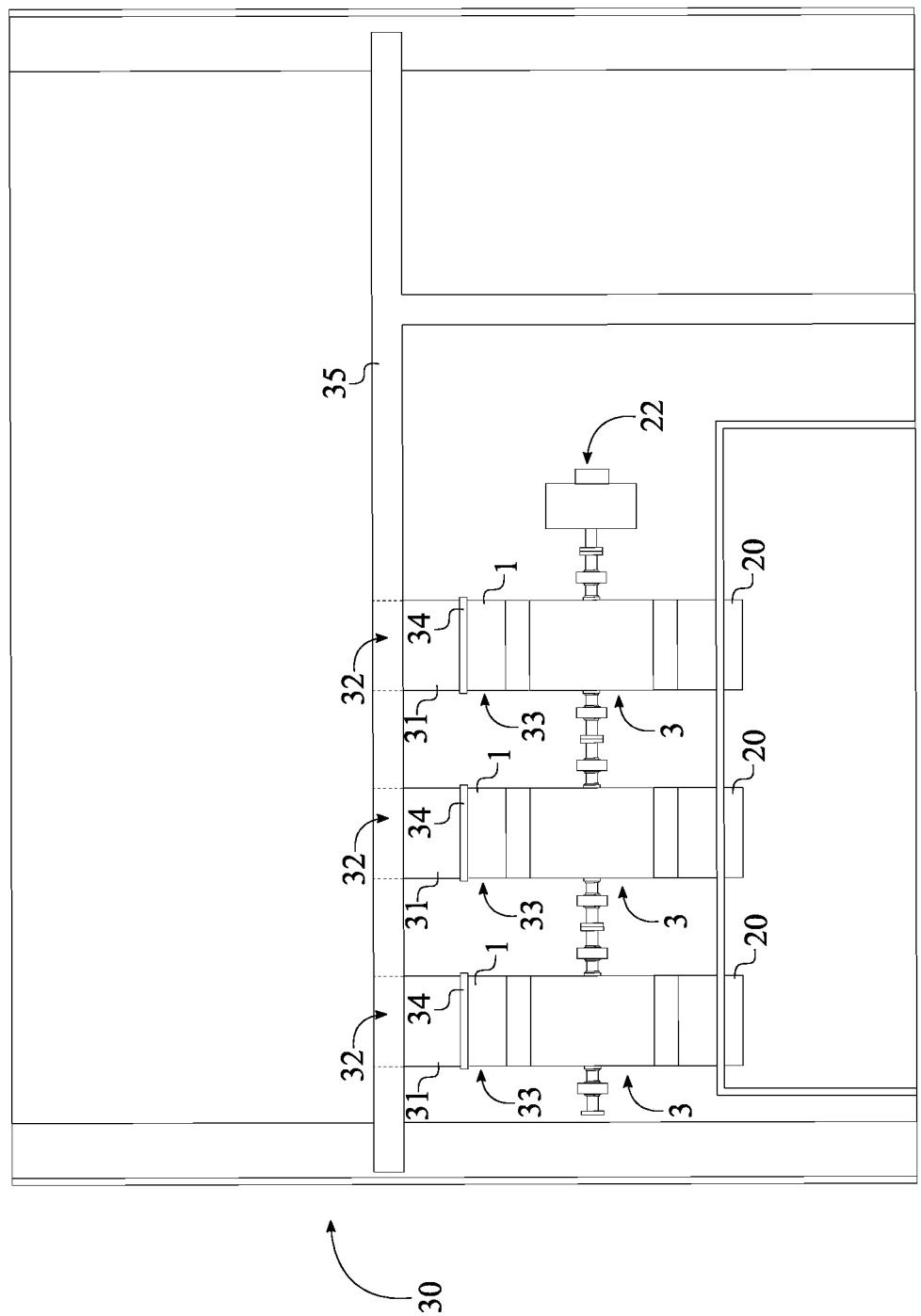
FIG. 8 is a top view of the present invention shown with the uni-directional flow system.

In reference to FIG. 7-8, the present invention can be utilized with the riverbed wherein a flowing body of water is obstructed through the weir 35. Since the flowing body of water travels from upstream to downstream, the weir 35 is able to create the pressurized water flow adjacent to the present invention. Due to the singular direction, this is also known as the uni-directional flow system 30. More specifically, when the inlet channel 1 is integrated into the uni-directional flow system 30, the uni-directional flow system 30 comprises at least one pressurized water conduit 31, at least one control valve 34, and the weir 35. An inlet end 32 of the pressurized water conduit 31 is in fluid communication with the weir 35 so that the pressurized water flow can enters into the inlet channel 1 via the weir 35. An outlet end 33 of the pressurized water conduit 31 is in fluid communication with the inlet channel 1 through the control valve 34 so that the pressurized water flow can enters into the water pressure containment chamber 18. The control valve 34 allows the present invention to control the flowrate of the pressurized water flow to further enhance the safety parameters of the present invention. Furthermore, the hydroelectric generator 22 utilized within the uni-directional flow system 30 is a uni-directional generator.

Figure 9:
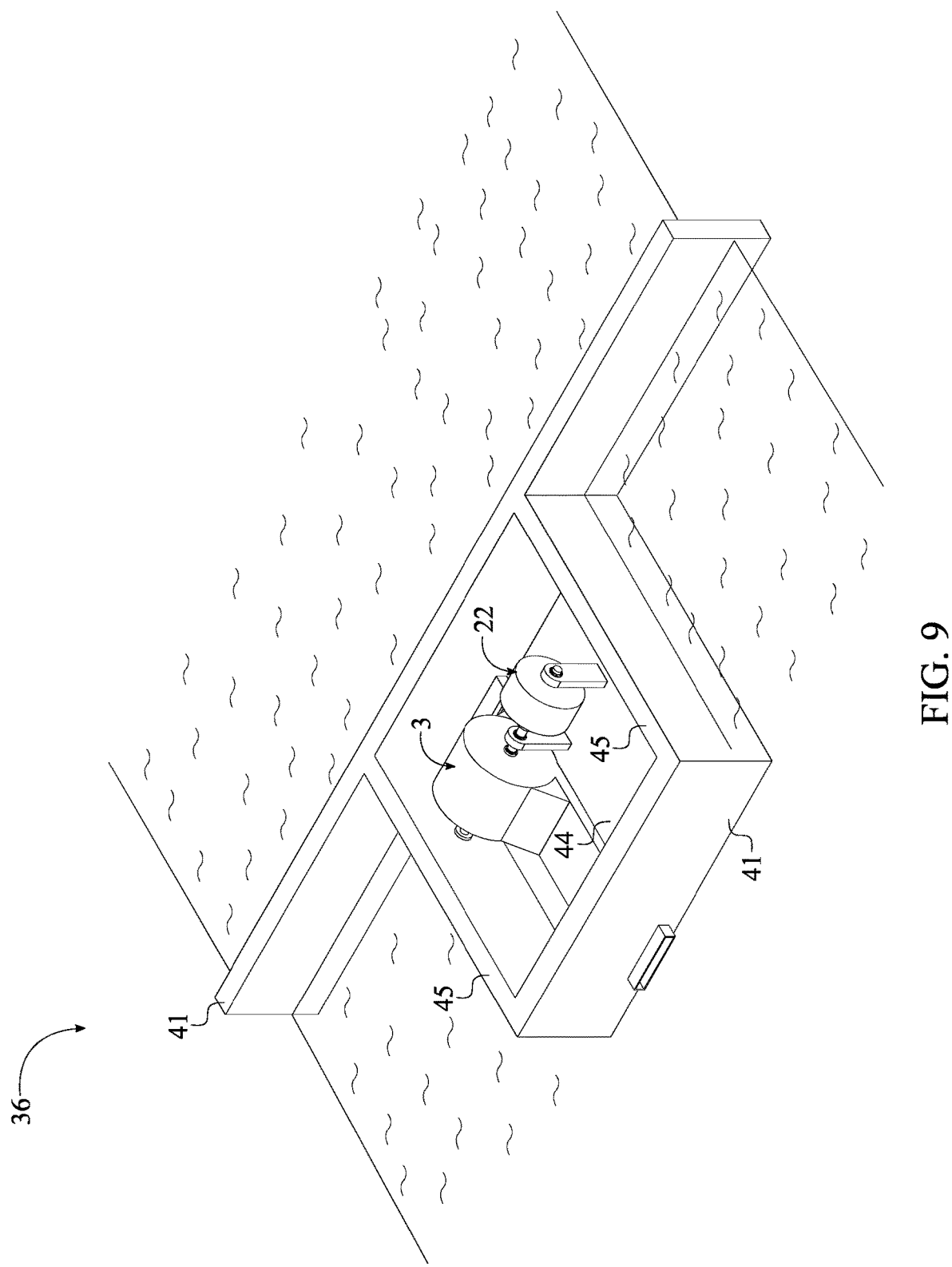
FIG. 9 is a perspective view of the present invention shown with the bi-directional tidal flow system.
Figure 10:
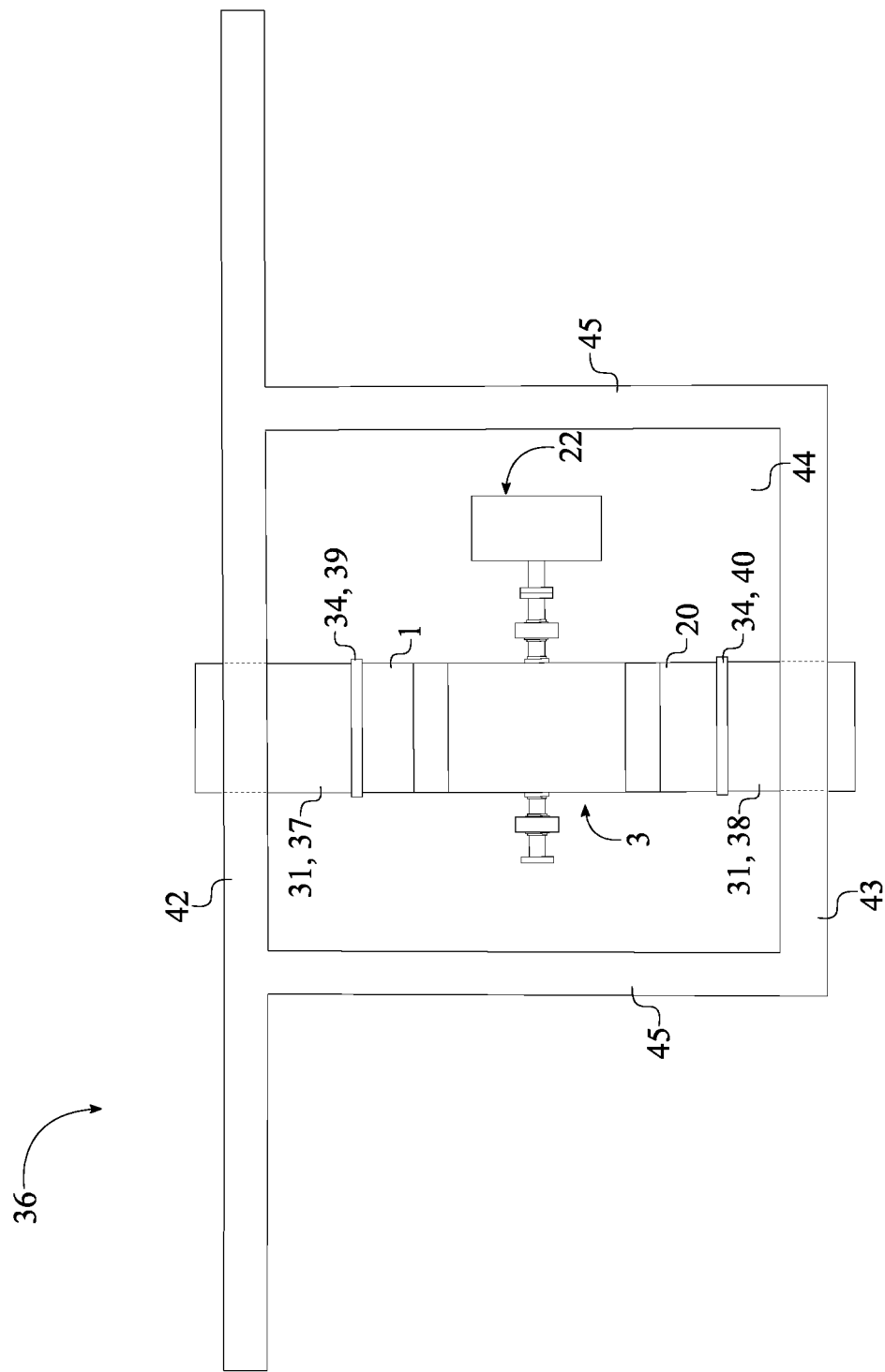
FIG. 10 is a top view of the present invention shown with the bi-directional tidal flow system.

In reference to FIG. 9-10, the present invention can be utilized with a tidal barrage which obstructs tidal flow with at least one tidal barrage wall 41. High-tide water on one side of the at least one tidal barrage wall 41 and low-tide water on the opposite side of the at least one tidal barrage wall 41 creates and imbalance of water pressure about the at least one tidal barrage wall 41. A channel or opening in the at least one tidal barrage wall 41 allows high pressure water to flow from the high-tide water side of the at least one barrage wall 41 to the low-tide water side of the at least one barrage wall 41. The tide changes flow direction every 6 hours causing the direction of channel flow to change directions every 6 hours. This tidal flow is known as the bi-directional tidal flow system 36. More specifically, when the inlet channel 1 is integrated into the bi-directional tidal flow system 36, the bi-directional tidal flow system 36 comprises at least one pressurized water conduit 31, at least one control valve 34, and the at least one tidal barrage wall 41. In reference to FIG. 10, a first wall 42 of the at least one tidal barrage wall 41 is in fluid communication with the inlet channel 1 through a first conduit 37 of the at least one pressurized water conduit 31 when the pressurized water flow is contained adjacent to the first wall 42. Then, the pressurized water flow can enter into the inlet channel 1 via the first conduit 37. A first valve 39 of the at least one control valve 34 is operatively coupled into the first conduit 37, wherein the first valve 39 controls the flowrate of the first conduit 37 as the pressurized water flow enters into the water pressure containment chamber 18. Then, the pressurized water flow is able to apply pressure to the plurality of paddle boards 17 and discharges through the outlet channel 20. In reference to FIG. 10, a second wall 43 of the at least one tidal barrage wall 41 is fluid communication with the outlet channel 20 through a second conduit 38 of the at least one pressurized water conduit 31 when the tide direction is reversed and the pressurized water flow is contained adjacent to the second wall 43. Then, the pressurized water flow can enter into the outlet channel 20 via the second conduit 38. A second valve 40 of the at least one control valve 34 is operatively coupled into the second conduit 38, wherein the second valve 40 controls the flowrate of the second conduit 38 as the pressurized water flow enters into the water pressure containment chamber 18. Then, the pressurized water flow is able to apply pressure to the plurality of paddle boards 17 and discharges through the outlet channel 20. Furthermore, the hydroelectric generator 22 utilized within the bi-directional tidal flow system 36 is a bi-directional generator.

The tidal barrage further comprises a pair of connector walls 45 that is structurally connected to the first wall 42 and the second wall 43 in a leak proof manner to prevent water from entering into a platform area 44 that houses the low-pressure enclosed turbine 3 and the hydroelectric generator 22. When the tide changes direction every 6 hours, the tidal flow is reversed through the bi-directional tidal flow system 36. With each change in tidal flow direction, the platform area 44 is able to remains dry due to the positioning of the pair of connector walls 45, the first wall 42, and the second wall 43.

In some embodiment of the present invention, the at least one the low-pressure enclosed turbine 3 can be a plurality of turbines. When the present invention incorporates multiple low-pressure enclosed turbines 3, each of the multiple low-pressure enclosed turbines 3 are axially connected to each other through an axle connector or any other types of connectors.

Although the invention has been explained in relation to its preferred embodiment, it is to be understood that many other possible modifications and variations can be made without departing from the spirit and scope of the invention as hereinafter claimed.

What is claimed is:

1. An enclosed hydroelectricity generator system comprising:
    an inlet channel;
    at least one low-pressure enclosed turbine;
    an outlet channel;
    at least one hydroelectric generator;
    the low-pressure enclosed turbine comprising an inner can, an outer housing, a turbine axle, a plurality of paddle boards, and a water pressure containment chamber;
    the turbine axle being concentrically connected to the inner can;
    the turbine axle and the inner can being symmetrically positioned with each other;
    the plurality of paddle boards being radially connected around the inner can;
    the inner can and the plurality of paddle boards being rotatably enclosed within the outer housing;
    the turbine axle symmetrically traversing through the outer housing;
    at least one paddle board from the plurality of paddle boards is fully and continuously engaged within the water pressure containment chamber;
    the inlet channel traversing into the outer housing;
    the outlet channel traversing into the outer housing;
    the inlet channel and the outlet channel being oppositely positioned of each about the water pressure containment chamber;
    the inlet channel being in fluid communication with the outlet channel through the water pressure containment chamber;
    the hydroelectric generator being operatively coupled with the turbine axle, wherein a kinetic energy of a pressurized water flow that enters into the water pressure containment chamber through the inlet channel is converted into hydroelectricity via the hydroelectric generator;
    the water pressure containment chamber comprising a concave floor section;
    the concave floor section being terminally connected to a bottom surface of the inlet channel and a bottom surface of the outlet channel, wherein an upper perimeter of the water pressure containment chamber is delineated by the inner can;
    a high pressure surface each of the plurality of paddle boards being oriented towards the inlet channel;
    a low pressure surface of each of the plurality of paddle boards being oriented towards the outlet channel;
    wherein the inlet channel is integrated into a uni-directional flow system;
    the uni-directional flow system comprising at least one pressurized water conduit, at least one control valve, and a weir;
    an inlet end of the pressurized water conduit being in fluid communication with the weir;
    an outlet end of the pressurized water conduit being in fluid communication with the inlet channel through the control valve;
    wherein the inlet channel and the outlet channel are integrated into a bi-directional tidal flow system;
    the bi-directional tidal flow system comprising at least one pressurized water conduit, at least one control valve, and at least one tidal barrage wall;
    a second wall of the at least one tidal barrage wall being fluid communication with the outlet channel through a second conduit of the at least one pressurized water conduit; and
    a second valve of the at least one control valve being operatively coupled into the second conduit, wherein the second valve controls the pressurized water flow of the second conduit.

2. The enclosed hydroelectricity generator system as claimed in claim 1 comprising:
    the outer housing comprising a radial plate, a first annular plate, and a second annular plate;
    the first annular plate and the second annular plate being oppositely positioned of each other about the radial plate;
    the first annular plate being perimetrically connected to the radial plate;
    a first end of the turbine axle concentrically traversing through the first annular plate;
    the second annular plate being perimetrically connected to the radial plate; and
    a second end of the turbine axle concentrically traversing through the second annular plate.

3. The enclosed hydroelectricity generator system as claimed in claim 2 comprising:
    a radial water channel;
    the radial water channel being delineated between the inner can, the radial plate, the first annular plate, and the second annular plate; and
    the plurality of paddle boards being rotatably interspaced within the radial water channel.

4. The enclosed hydroelectricity generator system as claimed in claim 1 comprising:
    a first base;
    a second base;
    a first axle bearing;
    a second axle bearing;
    the first base being positioned adjacent to a first end of the turbine axle;
    the second base being positioned adjacent to a second end of the turbine axle;
    the turbine axle being rotatably mounted to the first base through the first axle bearing; and
    the turbine axle being rotatably mounted to the second base through the second axle bearing.

5. The enclosed hydroelectricity generator system as claimed in claim 1 comprising:
    the hydroelectric generator comprising a stator, a rotor, and a supporting base;
    the stator being mounted to the supporting base; and
    the rotor being operatively coupled with the with the turbine axle, wherein a kinetic energy of a pressurized water flow that enters into the water pressure containment chamber through the inlet channel is utilized to rotate the rotor.

6. The enclosed hydroelectricity generator system as claimed in claim 1, wherein the hydroelectric generator is a uni-directional generator.

7. The enclosed hydroelectricity generator system as claimed in claim 1 comprising:
- the bi-directional tidal flow system comprising at least one pressurized water conduit, at least one control valve, and at least one tidal barrage wall;
- a first wall of the at least one tidal barrage wall being fluid communication with the inlet channel through a first conduit of the at least one pressurized water conduit; and
- a first valve of the at least one control valve being operatively coupled into the first conduit, wherein the first valve controls the pressurized water flow of the first conduit.

8. The enclosed hydroelectricity generator system as claimed in claim 1, wherein the hydroelectric generator is a bi-directional generator.

9. The enclosed hydroelectricity generator system as claimed in claim 1, wherein a length of the inner can is equal to a length of each paddle board.

\* \* \* \* \*